Patented Sept. 8, 1953

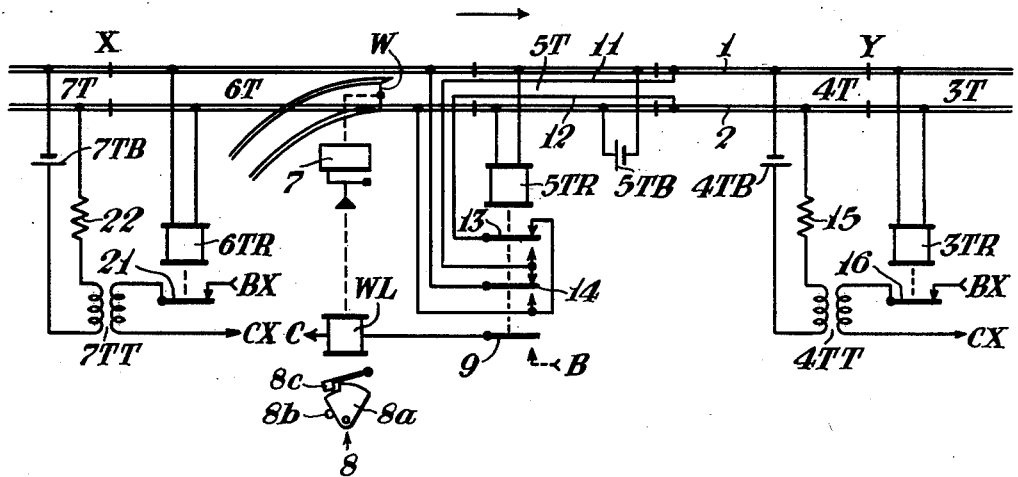

2,651,713

UNITED STATES PATENT OFFICE 2,651,713

MEANS FOR SUPPLYING RAILWAY CAB SIGNALING ENERGY THROUGH SHORT RAILWAY TRACK CIRCUITS

Frank B. Florencourt, Arlington, Mass., assignor to Westinghouse Air Brake Company, a corporation of Pennsylvania Application July 2, 1948, Serial No. 36,722

1 Claim. (Cl. 246—63)

My invention relates to track circuits for railway cab signals, and especially to track circuits for use in a stretch of railway track which is divided by means of insulated rail joints into two or more track sections.

It is sometimes desirable to provide at an intermediate location in a railway signal block section a relatively short subsection of track whose rails are insulated from the rails in the remainder of the section. By way of example, I have illustrated my invention herein as applied to such a subsection which serves as a releasing section for an electric switch lock. For a more complete disclosure of such a releasing section and its relationship to an electric switch lock, reference is made to Letters Patent of the United States No. 2,344,333, granted March 14, 1944, to James J. Van Horn, for Railway Traffic Controlling Apparatus, and more particularly, to the track section OT shown in Fig. 3a of that patent.

Railway cab signals are commonly operated by means of a receiver mounted on the vehicle adjacent the track rails and responsive to alternating track circuit current flowing in the track rails in front of the vehicle. Such signals are commonly arranged so that when no current is flowing in the track rails, the cab signal displays a stop aspect. When a vehicle equipped with such cab signal apparatus passes through a track subsection electrically separated from the other portions of the block section some means must be provided for insuring continuity of the cab signal indication under clear track conditions. Since the subsection must be kept electrically separate from the other portions of the block section, continuity of the cab signals has commonly required the use of one or more additional transformers for supplying the cab signal energy to the rails of the subsection and to the rails of the adjacent track on one or both sides of the subsection.

It is therefore an object of my invention to provide improved and simplified means for conveying alternating electrical energy for cab signal purposes to a vehicle passing through a track subsection electrically insulated from the other portions of the block section.

I accomplish this object of my invention by providing a pair of wires lying closely adjacent the rails of the insulated subsection so that the receiver on a passing vehicle will be within the magnetic field of the alternating current flowing in the wires. At the exit end of the subsection, for the normal direction of traffic movement, these wires are electrically connected to the rails of the adjacent track section in advance of the subsection. The subsection is provided with a track circuit including a detector track relay. This relay controls the connection of the wires at the entrance end of the subsection. When the subsection is occupied, the two wires are connected together by the detector track relay to provide a low resistance path for the cab signal current. When the subsection is unoccupied, the wires are connected at the entrance end to the rails of the adjacent track section in the rear of the subsection, so as to convey the cab signal energy to the rails of that track section. The relay contacts also shunt the rails of the section in the rear of the subsection when the insulated subsection is occupied. This insures the release of the track relay at the entrance end of the block whenever the subsection is occupied even though both of the adjacent track sections are unoccupied.

Other objects and characteristic features of my invention will become apparent as the description proceeds.

I shall describe one form of track circuit embodying my invention, and shall then point out the novel features thereof in the claim.

In the accompanying drawings, Fig. 1 shows a track plan of a typical block section including an outlying track switch and equipped with a track circuit system embodying my invention. Fig. 2 is a diagrammatic representation of one form of vehicle carried equipment suitable for use with the system of Fig. 1.

Referring to Fig. 1 of the drawings, a stretch of railway track is shown which comprises rails 1 and 2, and is divided by the usual insulated joints into sections 3T, 4T, 5T, 6T and 7T. The sections 4T, 5T, and 6T together form a complete block section having its entrance end indicated by the reference character X and its exit end indicated by the reference character Y. The subsection 5T serves as a releasing section for a track switch W operated by a switch stand 7 of conventional type, which has its hand-throw lever locked by an electric lock 8.

The electric lock 8 may be of any suitable type. For example, it may be one of the type described in United States Letters Patent No. 1,126,834, issued to Walter P. Neubert et al. on February 2, 1915. It comprises a locking segment 8a, whose movement is restricted both by the bail of a padlock diagrammatically shown at 8b, and by a locking dog 8c operated by an electromagnet WL. The locking segment 8a can be released to permit movement of the switch away from its normal position only when the padlock is removed and the electric lock is released by energization of electromagnet WL.

The subsection 5T is provided with a detector track circuit of conventional type including a battery 5TB and a track relay 5TR. The track relay 5TR is provided with a contact 9 which controls the electric lock 8. The circuits by which the track relay 5TR controls the electric lock 8 form no part of the present invention. They may take any suitable form, for example the form shown in the Van Horn patent hereinbefore referred to.

The block section X—Y is provided with track circuit apparatus forming a part of a cab signaling system for controlling traffic movements in the direction from left to right. This apparatus includes facilities at the exit location Y for supplying to the track rails 1 and 2 direct current and alternating current. At the entrance location X is a track relay 6TR which responds to the direct current. Vehicles which pass over the track are provided with cab signal apparatus as shown in Fig. 2, which is responsive to the alternating current.

The apparatus at locations X and Y and the cab signaling apparatus carried on the locomotive may take any suitable form. The apparatus described herein is to be understood to be similar to that shown in Letters Patent of the United States No. 1,428,894, granted to Lloyd V. Lewis on September 12, 1922, for Railway Traffic Controlling Apparatus.

According to my invention, the track circuit currents supplied at location Y to the rails of section 4T are carried through the track subsection 5T to the rails of section 6T by means of wires or conductors 11 and 12. These wires lie closely adjacent the rails 1 and 2 respectively, so as to be within the field of the vehicle carried receiver. In practice, I prefer to mount these wires by suitable supports on the webs of the rails.

The connections of wires 11 and 12 at the entrance end of section 5T are controlled by contacts 13 and 14 of track relay 5TR. The contacts are shown in the positions they assume when the track section 5T is unoccupied. Under this condition, wire 11 is connected over front contact 14 to rail 1 of section 6T. Wire 12 is connected over front contact 13 to rail 2 of track section 6T.

It may therefore be seen that the track circuit for the block section X—Y is normally complete from the upper terminal of track battery 4TB through rail 1 of the track section 4T, wire 11, front contact 14 of relay 5TR, rail 1 of track section 6T, the winding of track relay 6TR, rail 2 of track section 6T, front contact 13 of relay 5TR, wire 12, rail 2 of track section 4T, resistance 15 and the secondary winding of track transformer 4TT to the lower terminal of track battery 4TB.

The function of the track circuit for the block section X—Y, just described, is to control the relay 6TR in accordance with the condition of occupancy of that section. When section X—Y is unoccupied, the track relay 6TR is energized by the battery 4TB, through the circuit described above. When either section 4T or 6T is occupied, then the relay 6TR is shunted by the occupying vehicle or vehicles, and is therefore deenergized. When section 5T is occupied, then relay 5TR is shunted and drops its contacts, whereupon relay 6TR is disconnected from track battery 4TB and is also shunted through back contact 14 of relay 5TR. This action takes place even though sections 4T and 6T are unoccupied. Therefore, it may be seen that if any part of section X—Y is occupied, relay 6TR is released.

Alternating current of a suitable frequency, for cab signal control, is at times supplied to the track rails of section X—Y by means of the track transformer 4TT. The circuit for this current is the same as the track circuit for section X—Y, previously traced. Due to the high impedance of the winding of relay 6TR to alternating current, the flow of alternating current through this circuit is relatively small when the section is unoccupied. When the relay 6TR is shunted by a vehicle in the section 6T, the alternating current flow in the track circuit is increased. This current provides an alternating magnetic field adjacent the track, and the vehicles passing through the track section are provided with cab signaling apparatus including a receiver mounted adjacent the track rails and responsive to the magnetic field of the alternating current in the track rails.

The supply of alternating current of cab signaling frequency to the rails of track section X—Y is controlled by track relay 3TR in accordance with the occupancy of track section 3T. Track relay 3TR has a front contact 16 which controls a circuit from one terminal BX of a source of alternating electrical energy of suitable frequency, through contact 16, and the primary winding of track transformer 4TT to the other terminal CX of that source.

When track section 3T is unoccupied, track relay 3TR is energized, front contact 16 is closed, and alternating electrical energy is supplied to transformer 4TT and through it to the rails of section X—Y. Any vehicle equipped with cab signaling apparatus as described hereinafter in connection with Fig. 2 upon entering section 6T completes a circuit for the alternating track circuit current through its wheels and axles and the cab signaling apparatus thereon responds to indicate that the section in advance is unoccupied. When track section 3T is occupied, track relay 3TR is deenergized, front contact 16 is opened, and no alternating current energy is supplied to transformer 4TT, nor to the rails of section X—Y. The cab signal receiving apparatus on a vehicle in section X—Y then responds to indicate that the advance section is occupied.

Track relay 6TR similarly controls the supply of alternating current energy of cab signal frequency to section 7T in the rear, through front contact 21, track transformer 7TT, and protective resistance 22, in accordance with the occupancy of section X—Y.

Fig. 2 illustrates diagrammatically one suitable form of cab signal apparatus which may be used on a vehicle passing through section X—Y to receive cab signal energy from the rails. This apparatus comprises two iron receiver cores 17 and 17a, mounted on the vehicle in advance of the forward axle and located over the track rails 1 and 2. The two cores 17 and 17a are provided with receiver windings 18 and 18a, respectively. The coils are electrically connected in series opposition so that the potentials induced in them are additive, and this combined potential is then supplied to the input terminals of an amplifier 19 whose output terminals are connected to a train control relay TC. The cab signaling apparatus includes a suitable filter, not shown, so that relay TC is energized only when alternating energy of the proper frequency is picked up by the receivers. Relay TC operates a contact 20 which completes a circuit energizing a clear signal lamp G when the relay is energized, and completes a circuit energizing a signal lamp R when the relay is deenergized. Thus the clear signal lamp G is energized whenever the block section next in advance of the vehicle is unoccupied, and the stop signal lamp R is energized whenever the block section next in advance is occupied.

The wires 11 and 12, lying closely adjacent the rails of section 5T, insure the continuity of the supply of alternating current to the receivers on vehicles passing through that section, even though the track rails of section 5T are insulated from the adjacent sections 4T and 6T. When a vehicle enters section 5T, relay 5TR is shunted and thereby deenergized, closing its back contacts 13 and 14. Closure of back contact 14 connects the track rails of section 6T together, thereby shunting track relay 6TR, as previously described. Closure of back contact 13 connects wires 11 and 12 together, thereby providing a low resistance path for the alternating current, so that its value is substantially the same as if its path were completed through the wheels and axles of the vehicle in subsection 5T, as is the case when the front end of the vehicle is in section 6T or 4T.

When the train vacates section 5T, relay 5TR picks up, and when the train vacates section 4T, relay 6TR picks up, restoring the apparatus to its normal condition as shown.

Although I have herein shown and described only one form of track circuits for railway cab signals embodying my invention, it is understood that various changes and modifications may be made therein within the scope of the appended claim without departing from the spirit and scope of my invention.

Having thus described my invention, what I claim is:

In combination, a stretch of railway track over which railway vehicles are operated, equipped with signaling apparatus including a receiver responsive to alternating current in the track rails, insulated rail joints dividing said stretch into at least a first, a second and a third track section through which said vehicles move in the order named, a first track circuit including a source of electrical energy connected to the rails at the exit end of the third section and a first track relay connected to the rails at the entrance end of the first section, means at the exit end of the third section for supplying alternating current to the rails thereof for the control of a vehicle in said stretch, a pair of wires extending closely adjacent the rails of the second section for connecting the rails of the first section to the rails of the third section to complete said track circuit when the stretch is unoccupied and to complete a circuit for said alternating current through the wheels and axles of a vehicle in said first section, a second track circuit including a source of current, the rails of the second section and a second track relay, circuit controlling means governed by the second track relay and effective when the second section is occupied to connect the wires of said pair together at the entrance end of the second section to complete a circuit for said alternating current when a vehicle occupies said second section even though said first section is vacated, the alternating current flowing in said pair of wires being effective to energize said receiver while said vehicle is traversing said second section, said circuit controlling means being effective when said second section is occupied to also disconnect said wires from the rails of the first section to effect the release of said first track relay, traffic controlling means governed by said second track relay, and means governed by said first track relay for supplying alternating current to the track rails in the rear of the entrance end of said first section for the control of a vehicle approaching said stretch.

FRANK B. FLORENCOURT.

References Cited in the file of this patent
UNITED STATES PATENTS

| Number | Name | Date |
|---|---|---|
| 329,076 | Phelps | Oct. 27, 1885 |
| 1,686,036 | Ryder | Oct. 2, 1928 |
| 2,097,843 | Reichard | Nov. 2, 1937 |
| 2,105,930 | Reichard | Jan. 18, 1938 |
| 2,391,985 | Langdon | Jan. 1, 1946 |
| 2,514,454 | Nicholson | July 11, 1950 |
| 2,584,566 | Fereday | Feb. 5, 1952 |